United States Patent [19]

Hayashi et al.

[11] Patent Number: 5,107,218

[45] Date of Patent: Apr. 21, 1992

[54] METHOD OF OPERATION OF AIR CLEANER USED IN MOTOR VEHICLE

[75] Inventors: Nobuhiro Hayashi, Shiga; Yoshinori Takashima, Oumihachiman, both of Japan

[73] Assignee: Matsushita Electric Industrial Co., Ltd., Osaka, Japan

[21] Appl. No.: 530,702

[22] Filed: May 30, 1990

[30] Foreign Application Priority Data

Jun. 7, 1989 [JP] Japan ................................. 1-144587

[51] Int. Cl.$^5$ .................... G01R 31/06; H02H 7/18
[52] U.S. Cl. .................... 324/545; 307/10.7; 324/158 MG; 340/648
[58] Field of Search ............... 324/503, 545, 158 MG; 340/648; 307/10.1, 10.7

[56] References Cited

U.S. PATENT DOCUMENTS

| | | | |
|---|---|---|---|
| 3,037,124 | 5/1962 | Carlson | 307/10.1 |
| 3,742,303 | 6/1973 | Dageford | 361/31 |
| 4,459,548 | 7/1984 | Lentz et al. | 324/158 MG |
| 4,682,263 | 7/1987 | Gradnitzer et al. | 361/31 |
| 4,733,100 | 3/1988 | Nusairat et al. | 307/10.7 |
| 4,789,834 | 12/1988 | Koopman | 324/158 MG |
| 4,950,913 | 8/1990 | Kephart | 307/10.7 |

Primary Examiner—Kenneth A. Wieder
Assistant Examiner—Maura K. Regan
Attorney, Agent, or Firm—Lowe, Price, LeBlanc & Becker

[57] ABSTRACT

Method of operation of an air cleaner used in a motor vehicle, comprises the steps of: intermittently turning off a blower motor of the air cleaner at a given interval; detecting ripple components included in an output voltage developed by a dynamo driven by an engine of the motor vehicle by detecting the output voltage between dc power supply lines connected from the dynamo to the air cleaner; and maintaining turn off condition of the blower motor when the ripple component is lower than a given level during intermittently turning off the blower motor. When the engine is stopped, during the on interval of the blower motor, stoppage of the engine cannot be detected by watching the ripple components included in power supply lines. However, during the following intermittent turning off interval, stop of the engine can be detected because the ripple component due to operation of the blower motor is not developed. Therefore, the blower does not continue to run after the stopping of the engine, so that power stored in the battery is saved.

4 Claims, 4 Drawing Sheets

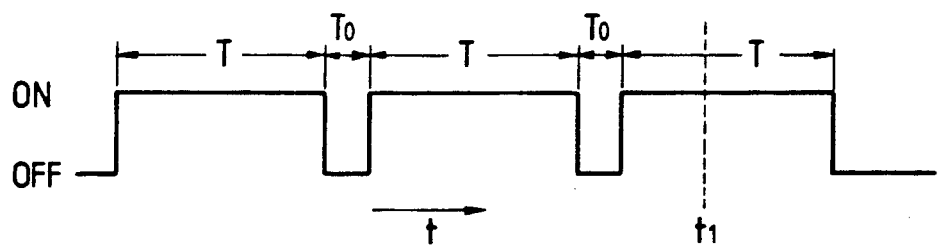
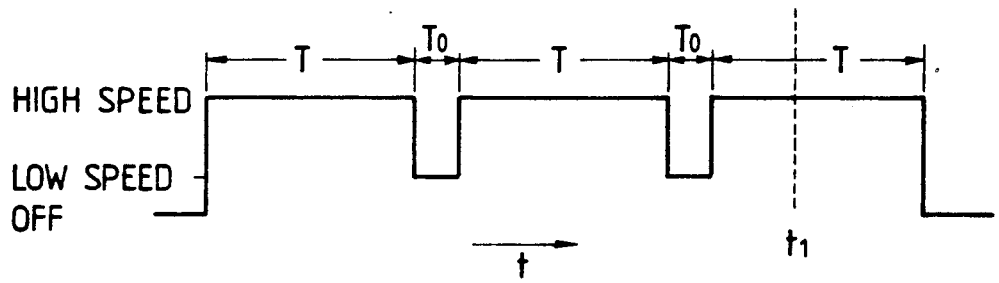
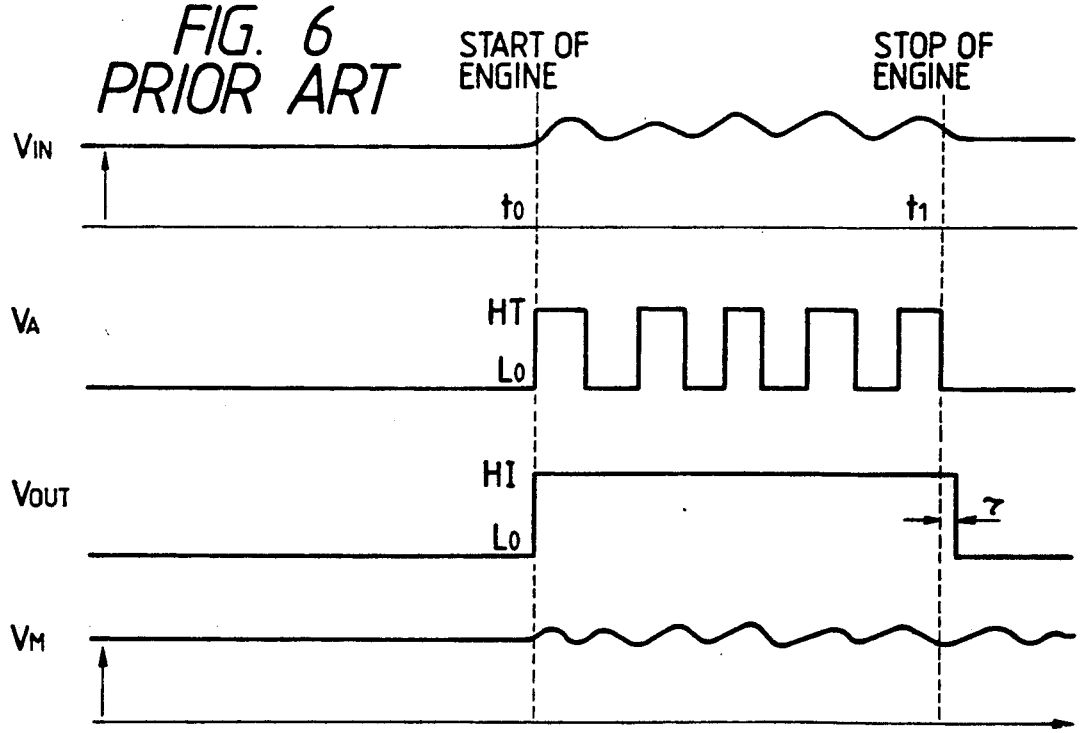

METHOD OF OPERATION OF AIR CLEANER USED IN MOTOR VEHICLE

BACKGROUND OF THE INVENTION

1. Field of the Invention

This invention relates to a method for operation of an air cleaner used in motor vehicle.

2. Description of the Prior Art

A method for operation the an air cleaner of prior art is as follows:

When an engine of a motor vehicle runs, a blower motor of the air cleaner provided to the motor vehicle is turned on or off in response to a manually operational switch. When the engine is stopped, the blower motor is turned off even if the manually operational switch indicates running state of the blower motor by detecting that rippled components in a supply voltage of the blower motor are lower than a given level. When the engine runs, a dynamo produces electric power, so that the supply voltage contains ripple components because a rectified alternate component developed by the dynamo or noise components developed with commutating is superimposed on an output voltage of a battery. However, when the engine does not run, the ripple component due to running of the dynamo is not developed. Therefore, the blower motor of the air cleaner can be turned off automatically by detecting absence of the ripple component for saving battery power. However, there is a drawback that if a blower motor with larger capacity is used, greater ripple components in the supply voltage are developed because noise components generated with commutation of the blower motor is large. As the result, stop page of the engine cannot be detected because the ripple component does not sufficiently decrease even if the dynamo stops, as shown in FIG. 6. Thus, the blower motor cannot be turned off automatically after engine stop page.

SUMMARY OF THE INVENTION

The present invention has been developed in order to remove the above-described drawbacks inherent to the conventional method of operation of an air cleaner used in motor vehicle.

According to the present invention there is provided a method of operation of an air cleaner used in a motor vehicle, comprising the steps of: intermittently turning off a blower motor of the air cleaner at a given interval; detecting ripple components included in an output voltage developed by a dynamo driven by an engine of the motor vehicle by detecting the output voltage of dc power supply lines connected between the dynamo and the air cleaner; and maintaining the off condition of the blower motor when the ripple component does not exceed a given level during the off condition of the blower motor.

According to the present invention there is also provided a method of operation of an air cleaner used in a motor vehicle, comprising the steps of: intermittently reducing rotating speed of a blower motor of the air cleaner at a given interval; detecting ripple components included in an output voltage developed by a dynamo driven by an engine of the motor vehicle by detecting the output voltage of dc power supply lines connected between the dynamo and the air cleaner; and turning off the blower motor when the ripple component does not exceed a given level during reduced rotating speed of the blower.

BRIEF DESCRIPTION OF THE DRAWINGS

The object and features of the present invention will become more readily apparent from the following detailed description taken in conjunction with the accompanying drawings in which:

FIG. 3 is an explanatory drawing of the first embodiment;

FIG. 5 is an explanatory drawing of the second embodiment; and

FIG. 6 is an explanatory drawing of a prior art.

The same of corresponding elements or parts are designated at like references throughout the drawings.

DETAILED DESCRIPTION OF THE INVENTION

Figure 1:
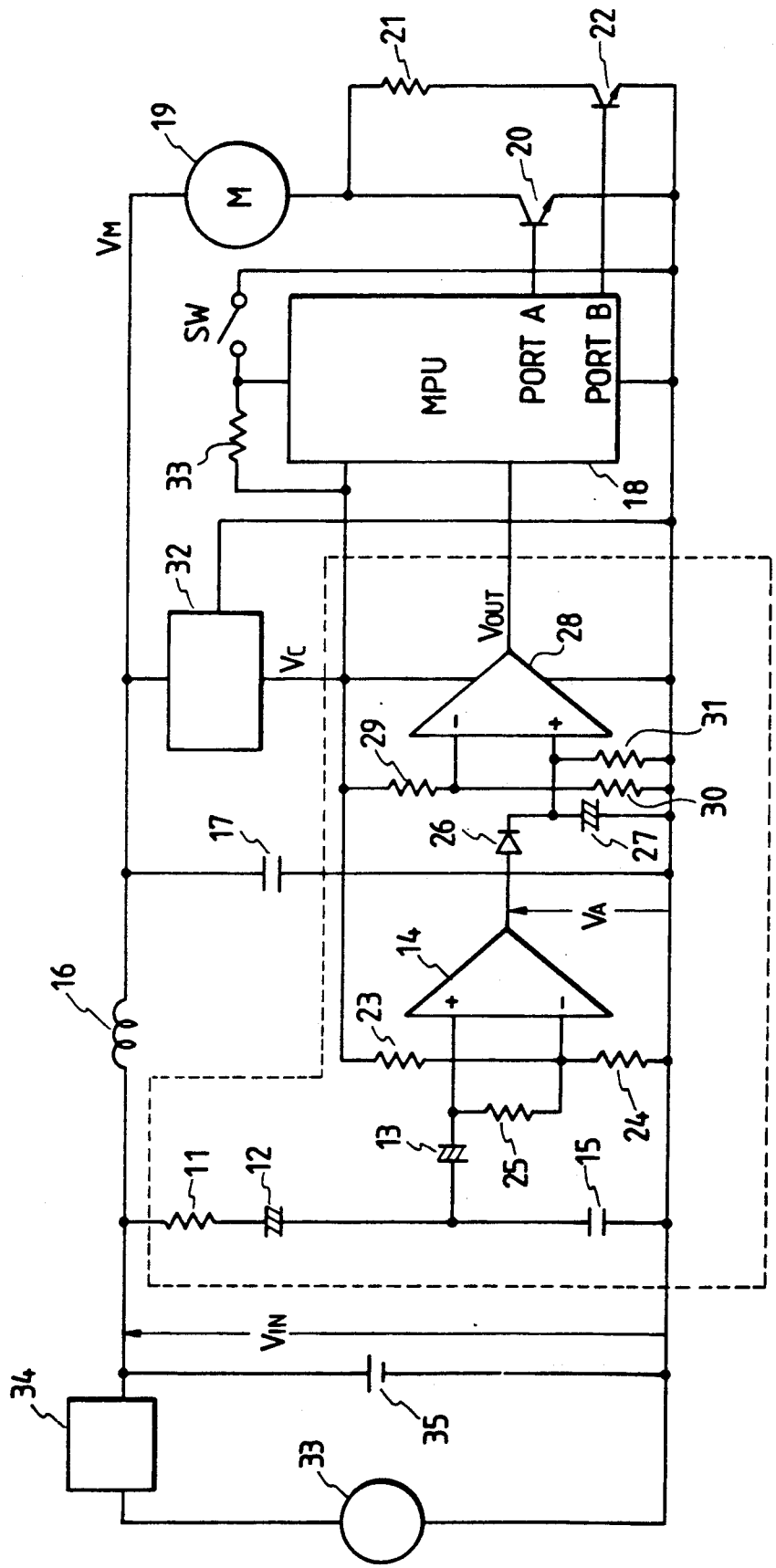
FIG. 1 is a block diagram of an air cleaner of first and second embodiments of the invention.

Referring now to the drawings, FIG. 1 is a block diagram of a first embodiment of an air cleaner of the invention and is used for second embodiment commonly.

In FIG. 1, a power supply voltage $V_{IN}$ is supplied by a battery 35 of an unshown motor vehicle which is charged by a dynamo 33 through a charging circuit 34 and is applied to a plus input of an operational amplifier 14 through a resistor 11, and capacitors 12, and 13. Thus, ac components in the power supply voltage $V_{IN}$ are coupled to the operational amplifier 14 which function as a comparator. The supply voltage $V_{IN}$ is also applied to a constant voltage source 32 through a filter comprising a choke coil 16 and a capacitor 17 and to a blower motor 19. Thus, the blower motor 19 is supplied with a voltage $V_M$. The constant voltage source 32 supplies a voltage $V_c$ to the operational amplifiers 14 and 28, a microprocessing unit (MPU) 18, and other circuitry. The blower motor 19 is driven by a transistor 20 directly and a transistor 22 through a resistor 21 in response to outputs of the port A and port B of the MPU 18 respectively. The supply voltage $V_c$ is divided by resistors 23 and 24. The divided voltage is applied to a minus input of the operational amplifier 14 and the plus input thereof as a bias potential. Thus, the plus side of the ac component from the supply voltage $V_{IN}$ is detected by the comparator 14, i.e., the operational amplifier 14. An output of the operational amplifier 14 rectified by a diode 26. The rectified signal charges a capacitor 27. A charge potential of the capacitor 27 is applied to plus input of the operational amplifier 28 whose minus input is supplied with a potential obtained by a divider comprising a resistor 29 supplied with supply voltage $V_c$ and a resistor 30. A resistor 31 connected to the plus input of the amplifier 28 discharges the capacitor 27. An output Vout of the operational amplifier 28 is fed to the MPU 18. The MPU 18 operates the blower motor 19 in response to the output Vout and a manually operational switch SW operated by a driver according to a program stored therein.

Figure 2:
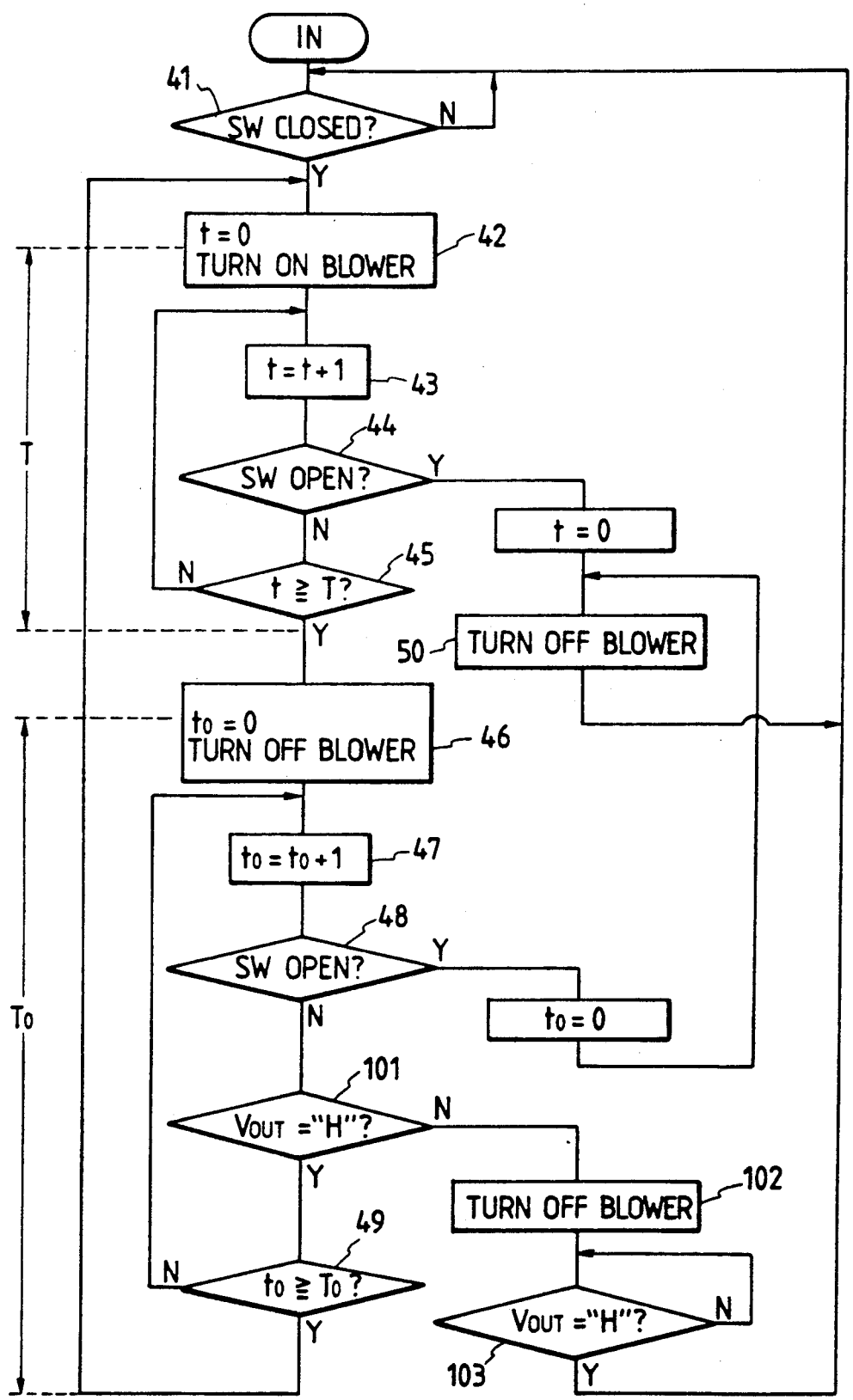
FIG. 2 shows a flow chart of the first embodiment.

The MPU 18 executes the program shown by a flow chart in FIG. 2.

In FIG. 2, processing starts at step 41, the MPU 18 detects whether the switch SW is closed, i.e., in running mode of the air cleaner. If the switch SW is closed processing proceeds to step 42. If NO, the MPU 18 waits for operation of the switch SW. In step 42, the MPU 18 clears a varible t and turns on the blower 19. In the following step 43, the variable t is counted up for measured time interval. In the succeeding step 44, a decision is as to whether the switch SW is made open to stop the blower 18. If the switch remains close processing proceeds to step 45. In step 45, a decision is made as to whether the variable t is equal to or greater than a predetermined interval T. If NO, processing returns to step 43 and loops until the variable t becomes equal to T or the switch 45 is detected open in step 44. In other words, the blower 19 is turned on for the interval T. When the variable t is equal to T, processing proceeds to step 46. In step 46, the MPU 18 clears $t_0$ and turns off the blower 19. In the following step 47, the variable $t_0$ is counted up for measured time interval. In the succeeding step 48, a decision is made as to whether the switch SW is open to stop the blower 18. If the switch remains closed processing proceeds to step 101. In step 101, the MPU 18 detects whether the output Vout is H. If the output Vout is not H, processing proceeds to step 102 because the engine stops. If YES, processing proceeds to step 49. In the step 49, a decision is made as to whether the variable $t_0$ is equal to or greater than a predetermined interval $T_0$. If NO, processing returns to step 47 and loops until the variable $t_0$ becomes equal to $T_0$ or the switch SW is detected open in step 48. In other words, the blower 19 is turned off for the interval $T_0$. When the variable $t_0$ is equal to $T_0$, processing returns to step 42. In steps 44 and 48, if the switch SW is open in step 44 or 48, in other words the driver intends to stop the blower motor 19, the MPU 18 turns off the blower motor 19 in step 50. In step 101, if the output Vout is not H, the MPU 18 turns off blower motor 19 in step 102 because the engine stops. In the following step 103, the MPU 18 detects whether the output Vout is H. If NO, processing waits for the H level of the output Vout. When the output Vout goes to H, in other words, the engine begins to run, processing returns to step 41.

Hereinbelow will be a description of the operation of this embodiment.

FIG. 3 shows rotation speed of the blower motor 19. The blower 19 is alternately turned on for interval T and off for interval $T_0$. When the engine is stopped at t1, the MPU 18 does not detect stoppage of the engine. However, during the following interval $T_0$ the MPU 18 can detect stoppage of the engine because the ripple component due to operation of the blower 19 is not developed. Therefore, the blower does not continue to run over the interval T after stopping of the engine, so that power stored in the battery is saved. Selecting value of the interval $T_0$ shorter than the interval T prevents considerable decrease in actual capacity of the blower 19.

Hereinbelow will be described a second embodiment of the invention.

Figure 4:
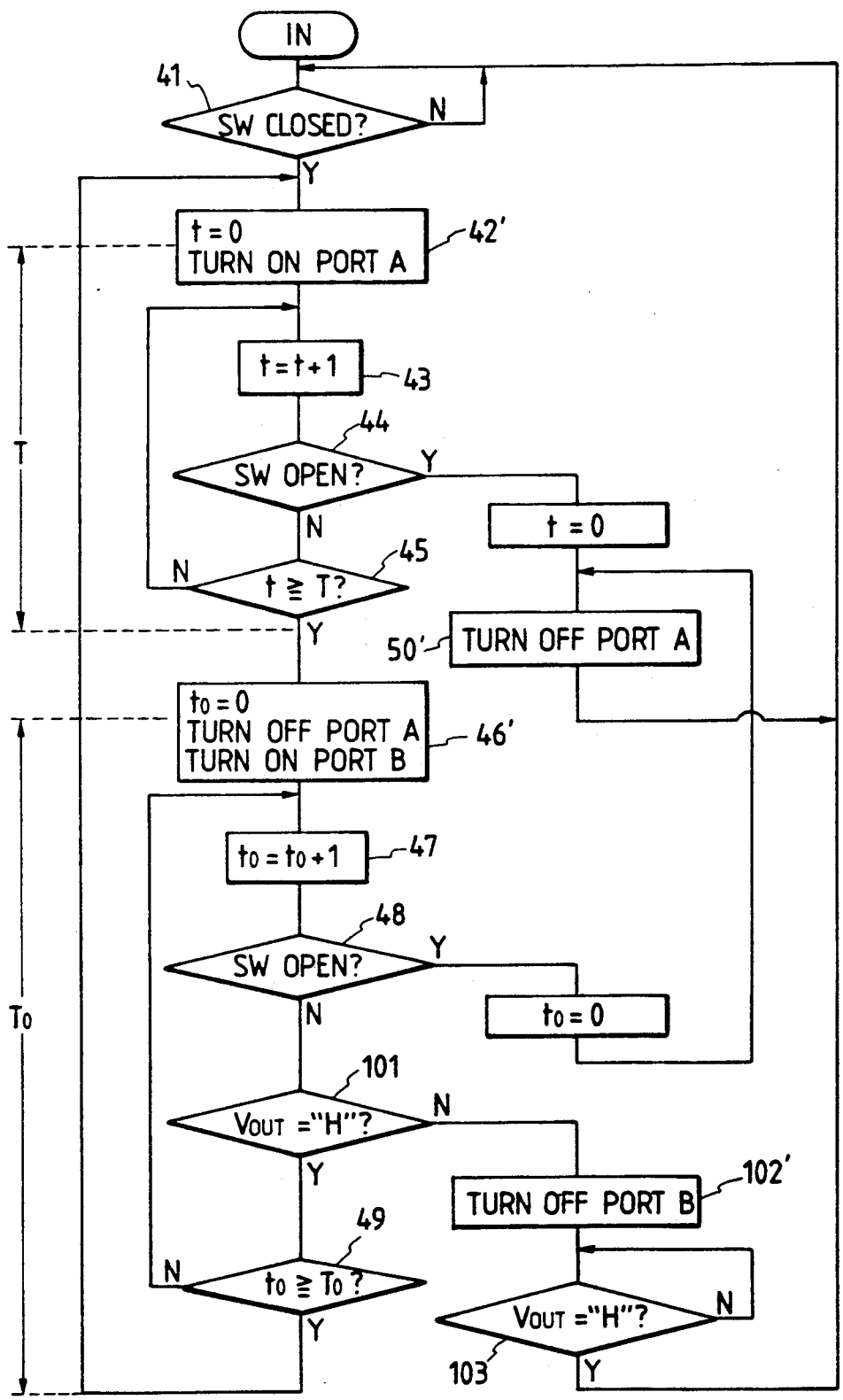
FIG. 4 shows a flow chart of the first embodiment.

Basis structure of the second embodiment is the same as that of the first embodiment. There is a difference that the MPU 18 controls both ports A and B to provide two rotating speeds of the blower 19. When only port A is H, the blower 19 rotates at a high speed. On the other hand, when the port B is H, the blower 19 rotate at a low speed. A value of the low speed is so selected that ripple components in the supply voltage $V_{IN}$ is sufficiently lower to detect stoppage of the engine. Moreover, some steps of a flow chart of FIG. 2 is substituted with modified steps FIG. 4 is a flow chart of the second embodiment. In FIG. 4, 42' corresponds to step 42 in FIG. 2. In step 42', the MPU 18 turns on port A to rotate the blower motor 19 at a high speed for interval T. After interval T, in step 46', the MPU 18 turns off the port A and turns on the port B to rotate the blower motor 19 at a low speed for the interval $T_0$. Step 50' corresponds to step 50 in FIG. 2. In step 50', the MPU 18 turns off the blower similarly. Step 102' corresponds to step 102 in FIG. 2. In step 102', the MPU 18 turns off the blower motor 19 similarly. Other processing is the same as that of the first embodiment, so detailed description is omitted.

FIG. 5 shows operation of the blower motor 19. The blower motor 19 alternately rotates at a high speed for interval T and at a low speed for interval $T_0$. When the engine is stopped at t1, the MPU 18 does not detects stoppage of the engine. However, during the following interval $T_0$ the MPU 18 can detect stoppage of the engine because the ripple component due to operation of the blower 19 is reduced sufficiently. Therefore, the blower does not continue to run over the interval T after stopping of the engine, so that power stored in the battery is saved. Selecting value of the interval $T_0$ shorter than the interval T prevents considerable decrease in actual capacity of the blower 19.

What is claimed is:

1. Method of operation of an air cleaner including a blower motor used in a motor vehicle having a dynamo driven by an engine of said motor vehicle for producing a supply voltage including a first ripple component and dc power supply lines connected from said dynamo to said air cleaner blower motor, comprising the steps of:
   (a) removing a second ripple component developed by said blower motor from said first and second ripple components between said dc power supply lines by intermittently turning off a blower motor of said air cleaner at a given interval;
   (b) detecting said first and second ripple components by detecting said supply voltage between said dc power supply lines; and
   (c) maintaining turn off condition of said blower motor when said first and second ripple components are lower than a given level during intermittent turn off of said blower motor.

2. Method of operation of an air cleaner used in a motor vehicle, comprising the steps of:
   (a) intermittently reducing rotating speed of a blower motor of said air cleaner at a given interval;
   (b) detecting ripple components included in an output voltage developed by a dynamo driven by an engine of said motor vehicle by detecting said output voltage between dc power supply lines connected from said dynamo to said air cleaner; and
   (c) turning off said blower motor when said ripple component is lower than a given level during intermittently reducing rotating speed of said blower.

3. In a motor vehicle including an engine, a dynamo driven by said engine to produce a dc power supply voltage applied to dc supply lines having a first ripple component and an air cleaner having a blower motor powered by said dc supply lines, said blower motor when operating producing a second ripple component in said dc supply lines, a method of operating said air cleaner comprising the steps of:
   (a) intermittently disconnecting said blower motor from said supply lines to remove said second ripple component during disconnection of the blower motor;

(b) detecting the voltage on said supply lines during disconnection of said blower motor; and (c) maintaining disconnection of said blower motor from said supply lines in response to detection of a ripple component on the supply lines attaining a value less than a predetermined value.

4. In a motor vehicle including an engine, a dynamo driven by said engine to produce a dc power supply voltage applied to dc supply lines having a first ripple component and an air cleaner having a blower motor powered by said dc supply lines, said blower motor when operating producing a second ripple component in said dc supply lines, a method of operating said air cleaner comprising the steps of:

(a) intermittently reducing the speed of said blower motor;

(b) detecting the voltage on said supply lines during periods of reduced blower motor speed; and (c) disconnecting said blower motor from said supply lines in response to detection of a ripple component on the supply lines attaining a value less than a predetermined value.

* * * * *